US008500357B2

United States Patent
Stahle

(10) Patent No.: US 8,500,357 B2
(45) Date of Patent: Aug. 6, 2013

(54) TELESCOPIC LOCK

(75) Inventor: Ragnar Stahle, Ljungskile (SE)

(73) Assignee: Fast Industriprodukter HB, Ljungskile (SE)

( * ) Notice: Subject to any disclaimer, the term of this patent is extended or adjusted under 35 U.S.C. 154(b) by 0 days.

(21) Appl. No.: 12/867,601

(22) PCT Filed: Feb. 15, 2009

(86) PCT No.: PCT/SE2009/000089
§ 371 (c)(1),
(2), (4) Date: Oct. 13, 2010

(87) PCT Pub. No.: WO2009/102260
PCT Pub. Date: Aug. 20, 2009

(65) Prior Publication Data
US 2011/0027012 A1    Feb. 3, 2011

(30) Foreign Application Priority Data
Feb. 16, 2008 (SE) ....................................... 0800359

(51) Int. Cl.
*F16B 7/02* (2006.01)

(52) U.S. Cl.
USPC ................... 403/109.7; 403/374.4; 135/75

(58) Field of Classification Search
USPC .......... 403/109.1, 109.2, 109.4, 109.5, 109.7, 403/370, 371, 374.2, 374.4; 135/75; 248/411, 248/412
See application file for complete search history.

(56) References Cited

U.S. PATENT DOCUMENTS

| 2,512,985 | A | * | 6/1950 | Tveten | 280/823 |
|---|---|---|---|---|---|
| 2,599,222 | A | | 6/1952 | Bergovist et al. | |
| 2,972,495 | A | * | 2/1961 | Yalen | 403/176 |
| 3,528,253 | A | * | 9/1970 | Kovacs | 411/60.3 |
| 6,361,002 | B1 | * | 3/2002 | Cheng | 248/161 |
| 6,862,776 | B2 | * | 3/2005 | Chen | 16/113.1 |
| 7,802,768 | B2 | * | 9/2010 | Carnevali | 248/412 |
| 2006/0193679 | A1 | * | 8/2006 | Lin | 403/109.5 |
| 2006/0204322 | A1 | * | 9/2006 | Roiser | 403/109.5 |
| 2007/0248406 | A1 | * | 10/2007 | Stahle | 403/379.4 |
| 2009/0245927 | A1 | * | 10/2009 | Stahle et al. | 403/109.5 |
| 2010/0316438 | A1 | * | 12/2010 | Sohn | 403/109.1 |
| 2012/0000497 | A1 | * | 1/2012 | Kim | 135/75 |

FOREIGN PATENT DOCUMENTS

| EP | 1748196 | 1/2007 |
|---|---|---|
| WO | 2005085659 | 9/2005 |

* cited by examiner

*Primary Examiner* — Joshua Kennedy
(74) *Attorney, Agent, or Firm* — Ladas & Parry, LLP

(57) ABSTRACT

A locking device interacting with a drive member and including an inner tube and an outer tube; where the inner tube has a first free end that projects from, and is axially displaceable from, a first end of the outer tube; where there is a locking member on the other end of the inner tube, said locking member providing the means whereby the inner tube and the outer tube can be releasably locked in various axial positions relative to each other; where the locking member includes a tubular locking sleeve that is slotted by at least one axially aligned slot and a wedge that includes wedge surfaces, the wedge surfaces being, when acted upon by a drive member, displaceable along and relative to interacting wedge surfaces of the locking sleeve, such displacement pressing the locking sleeve against the outer tube, the inner tube and the outer tube.

12 Claims, 12 Drawing Sheets

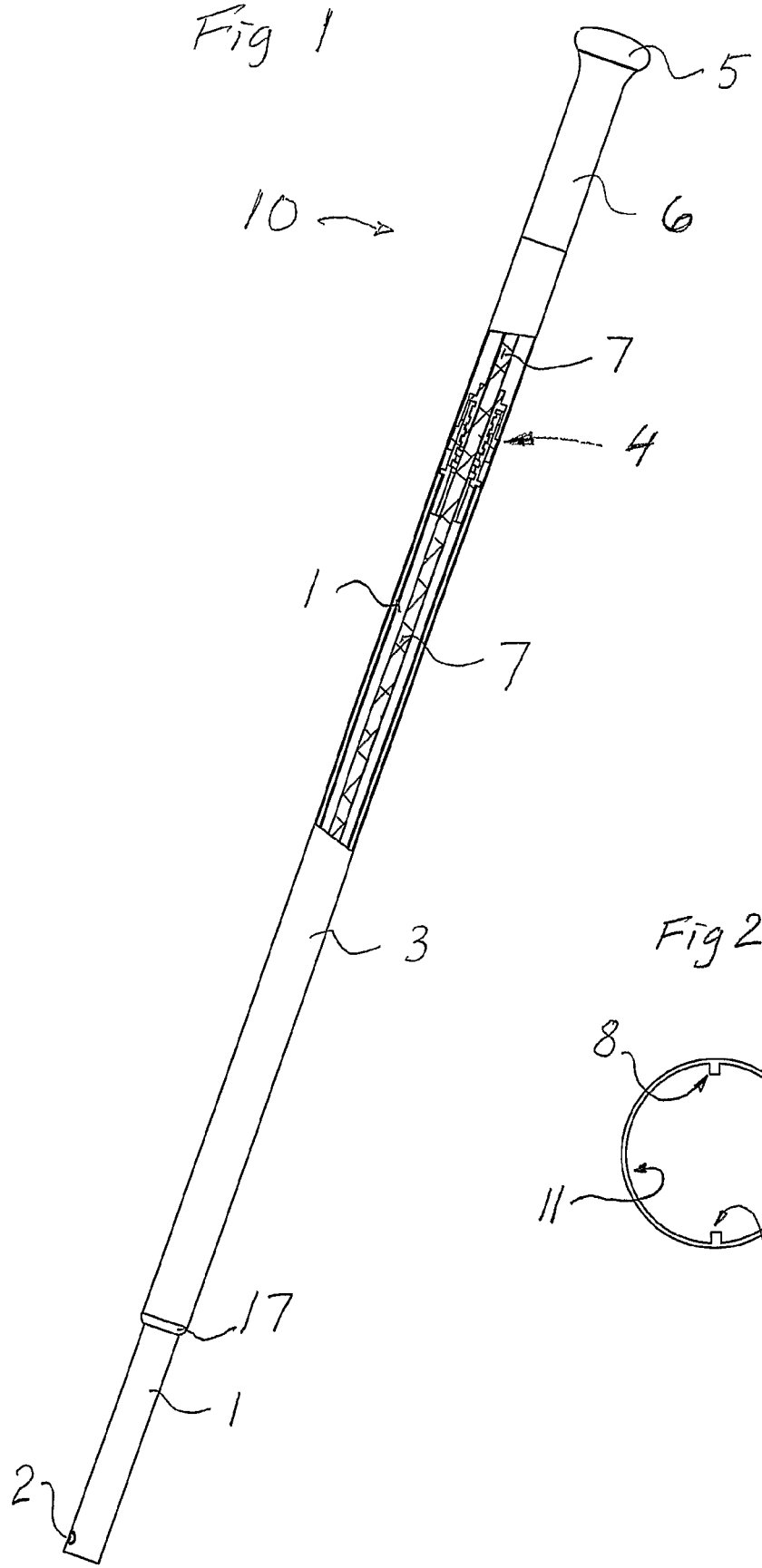
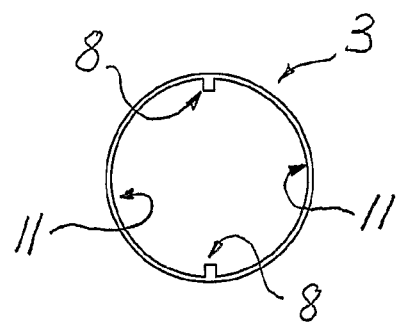

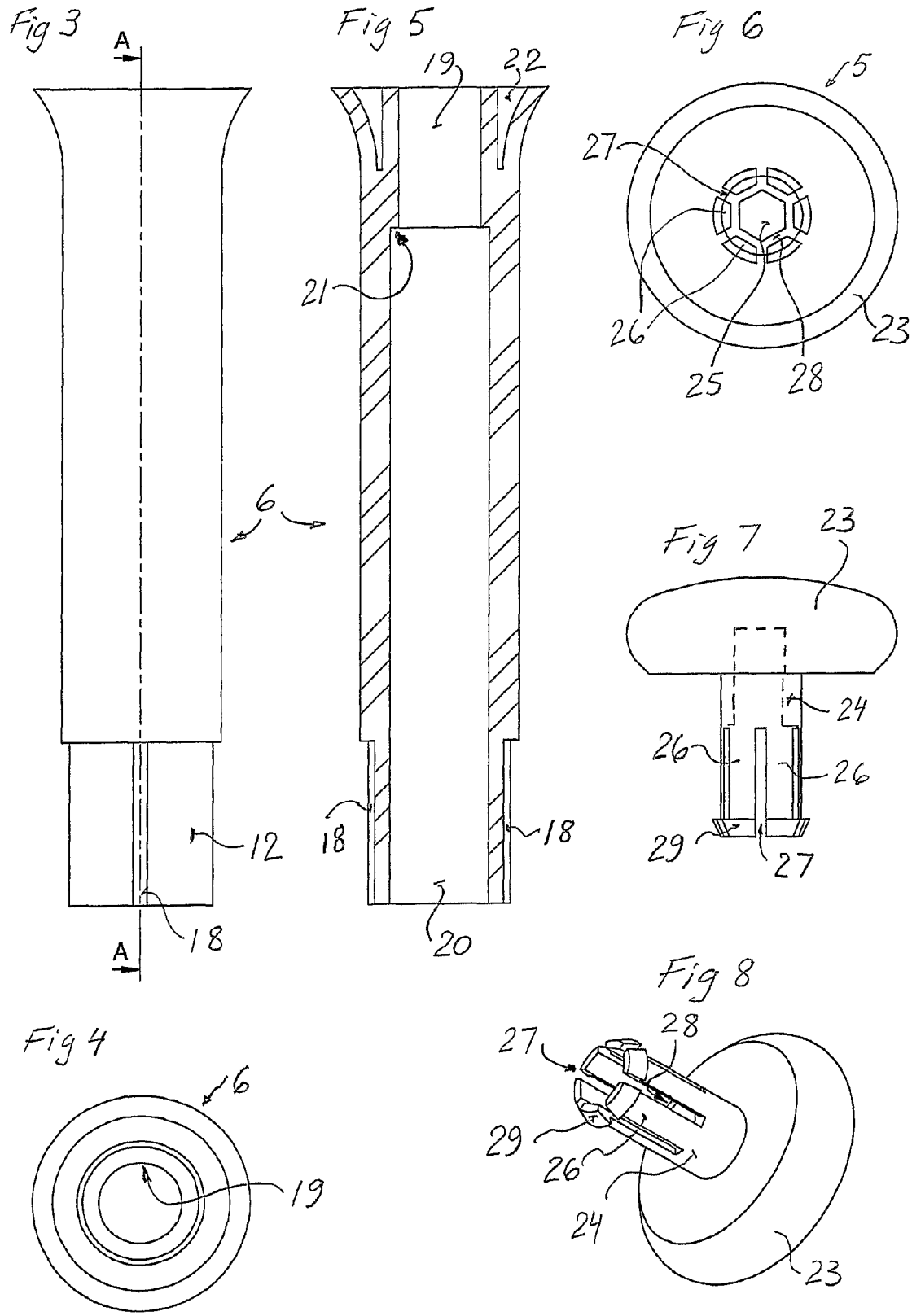

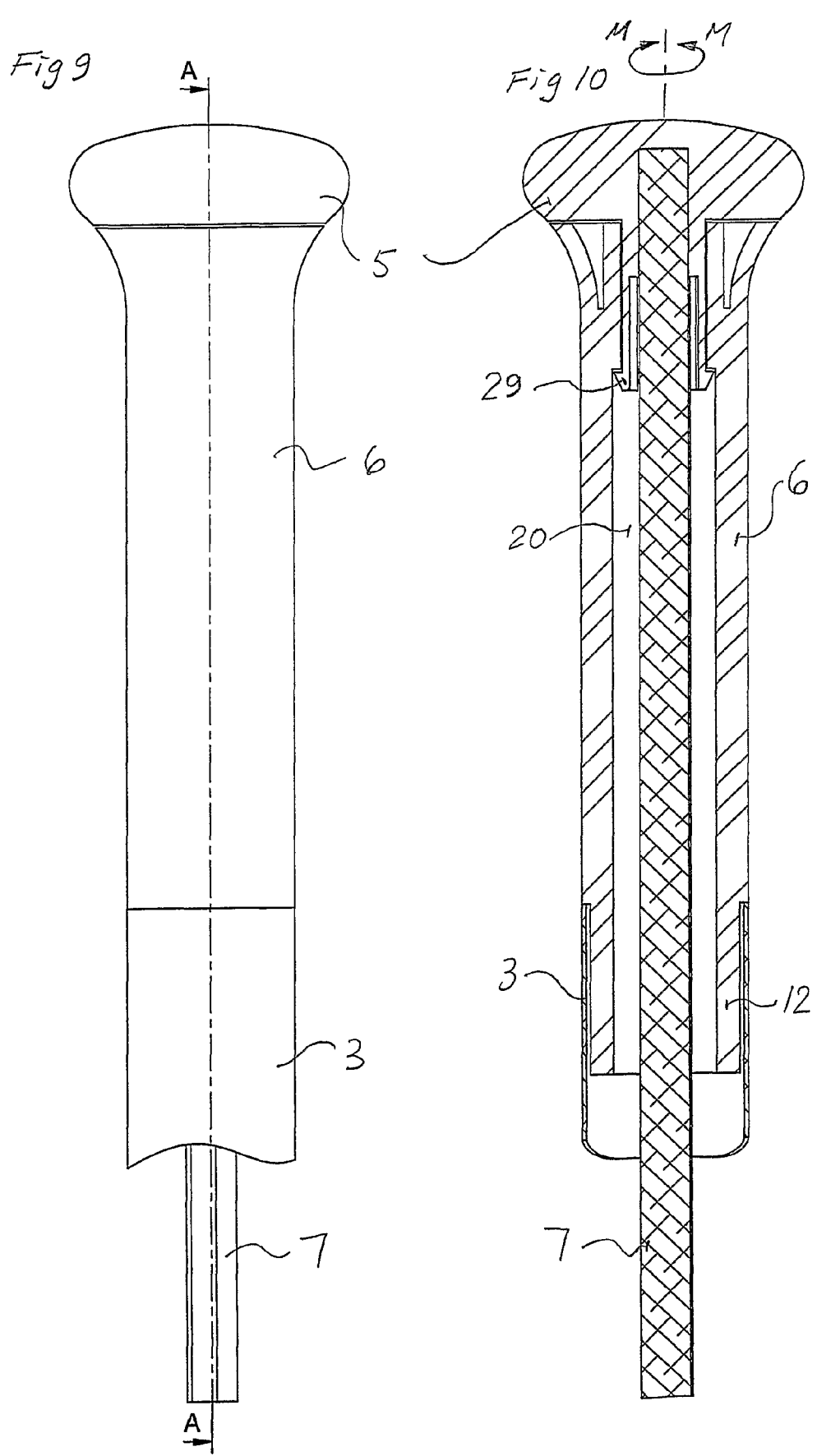

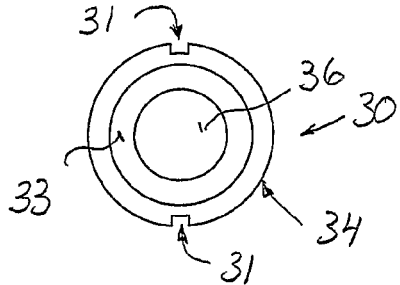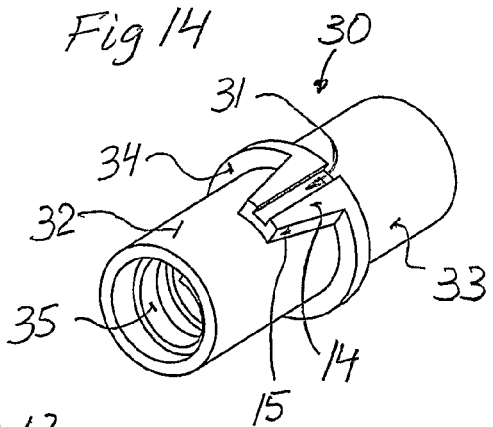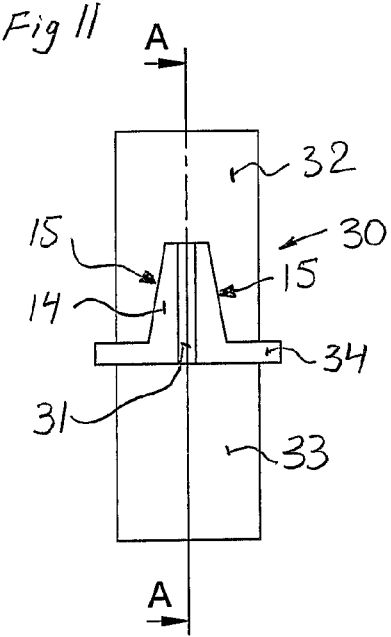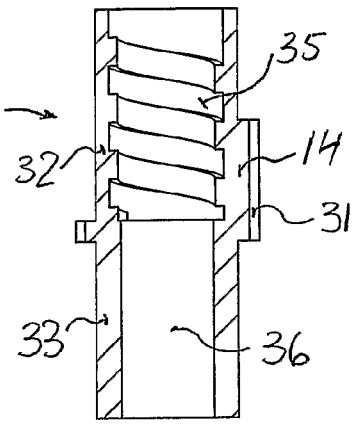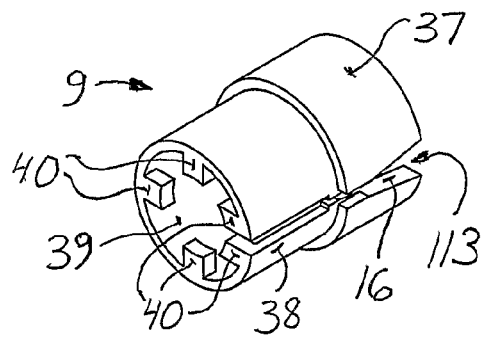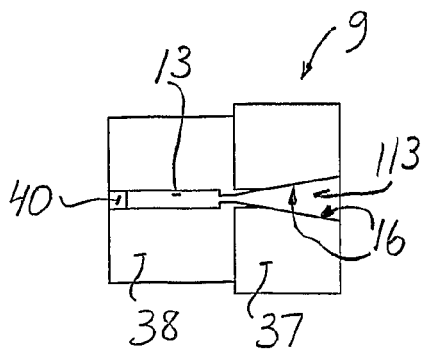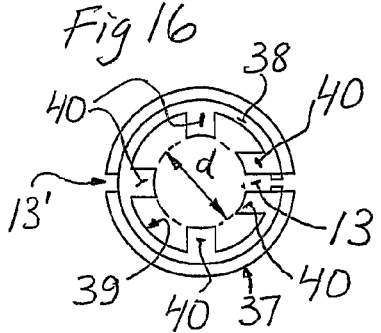

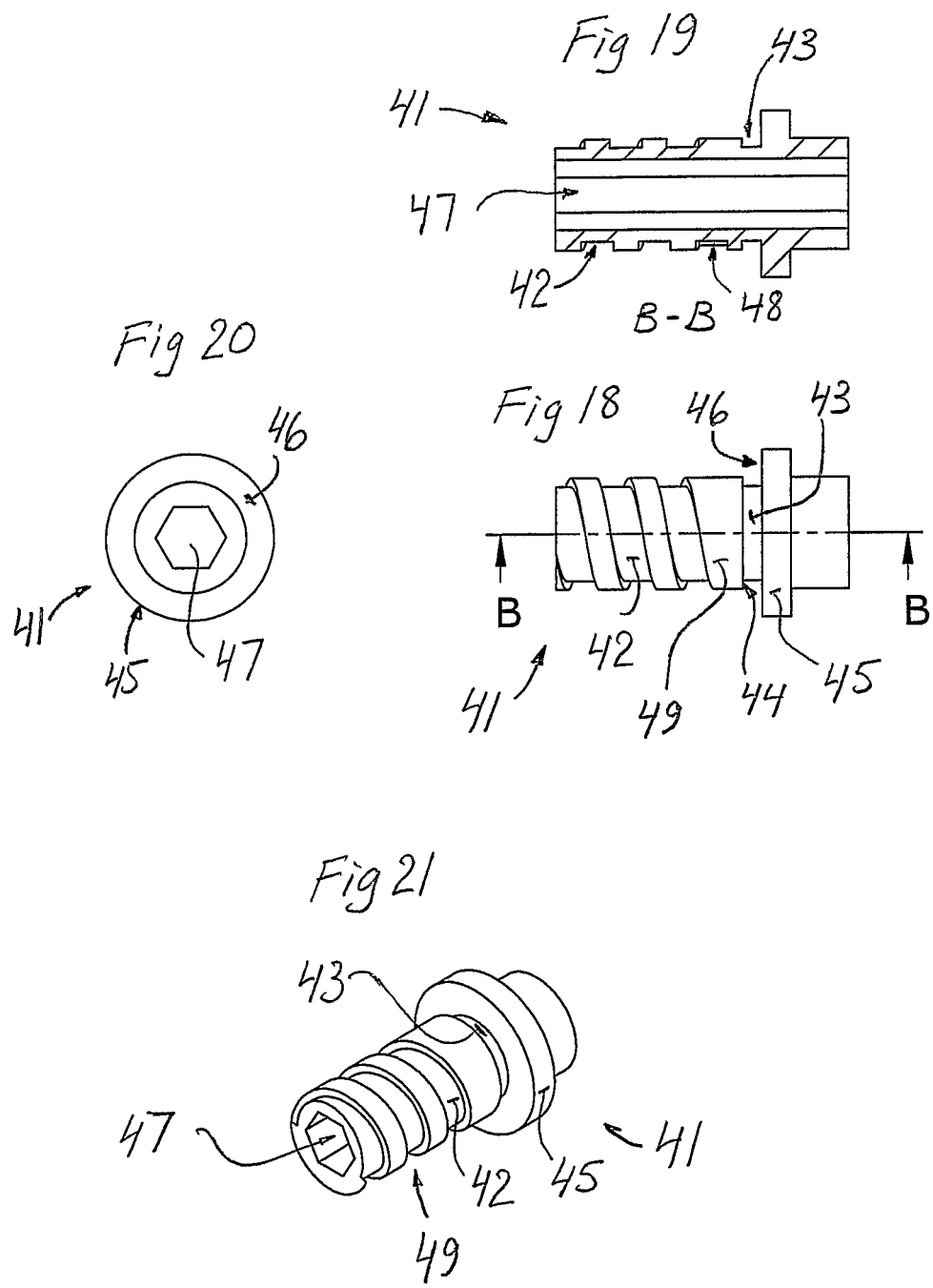

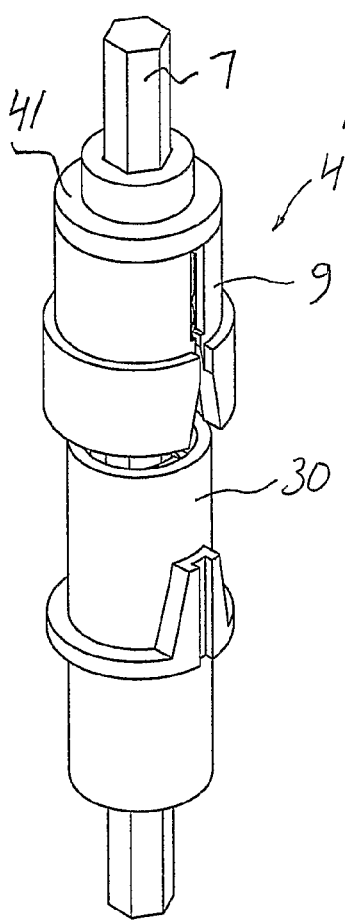
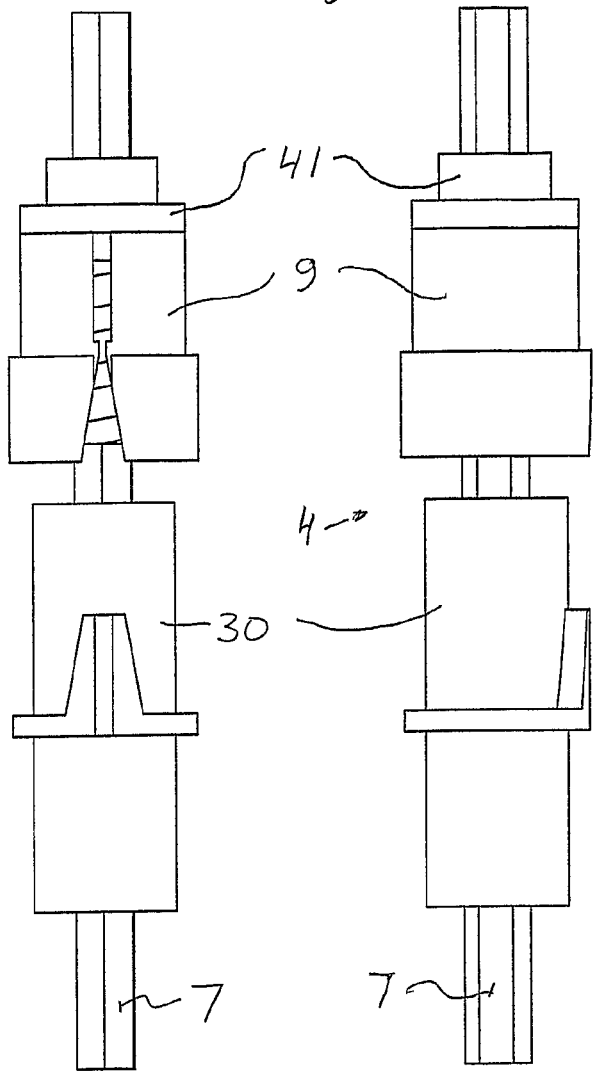
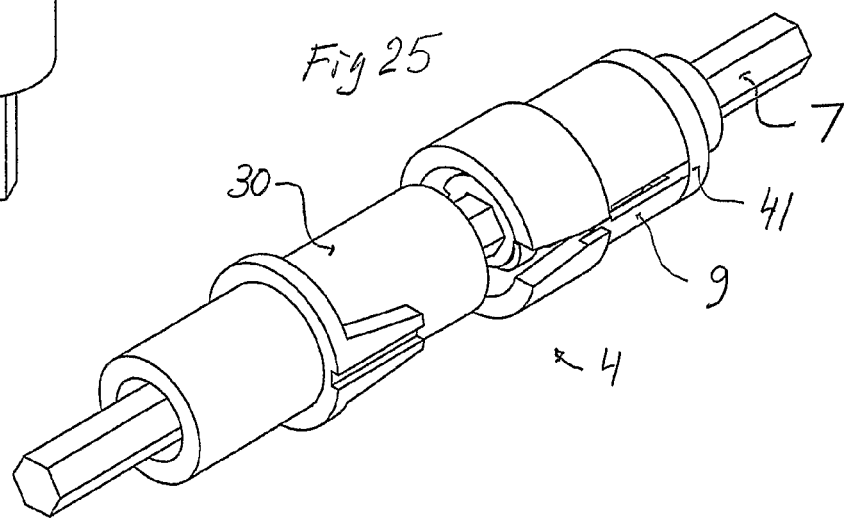

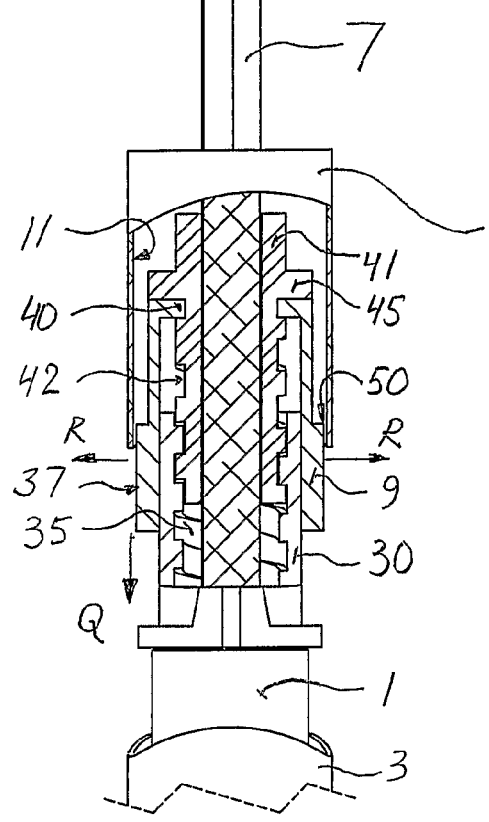
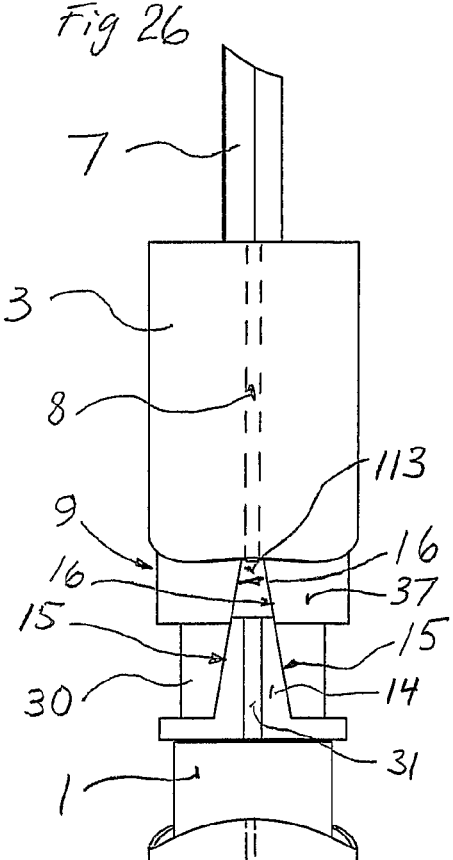
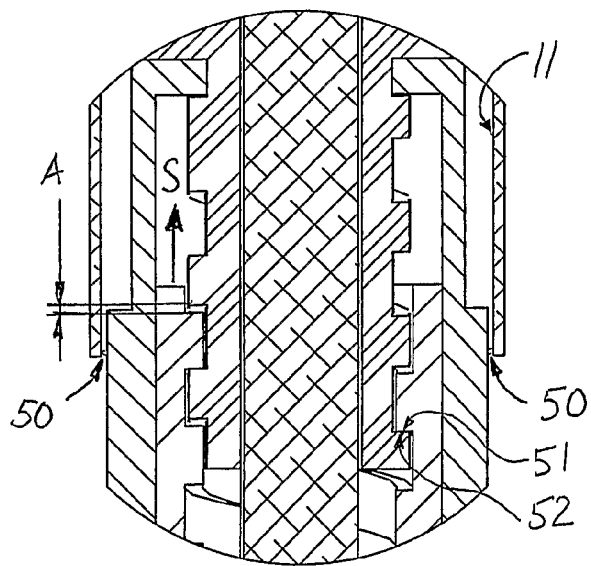
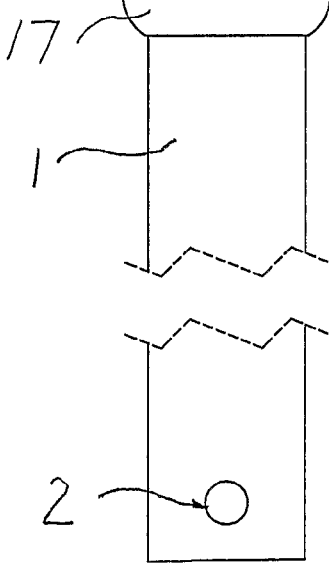

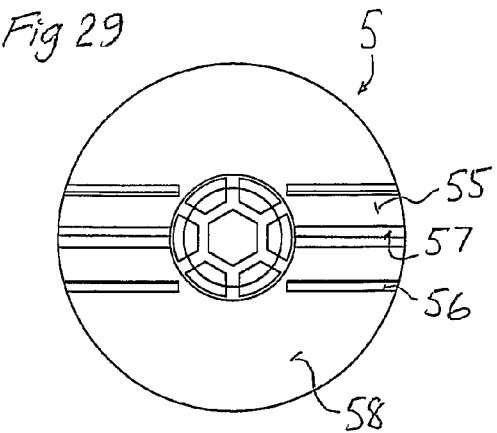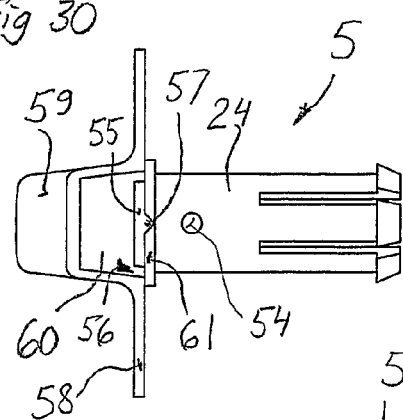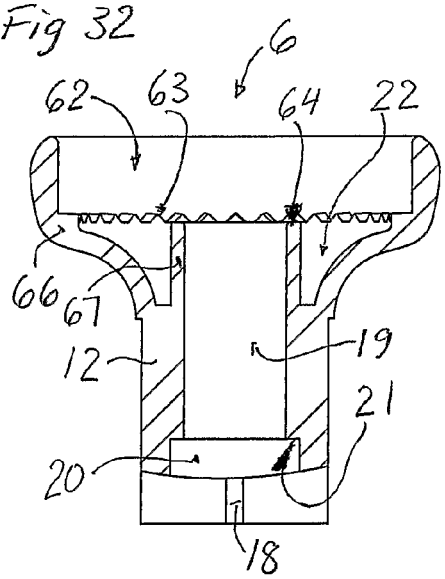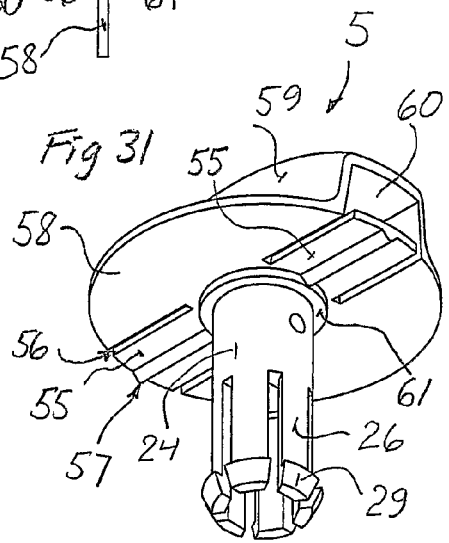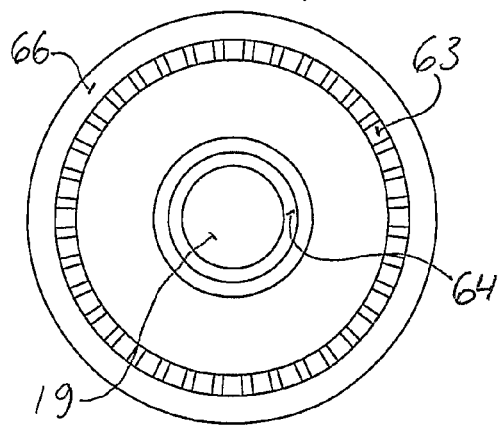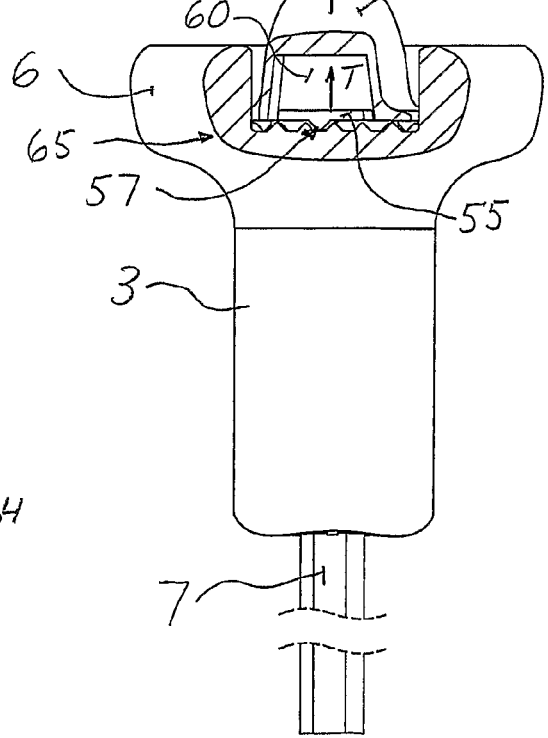

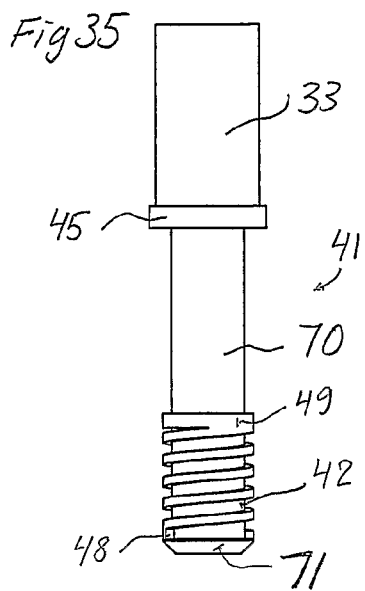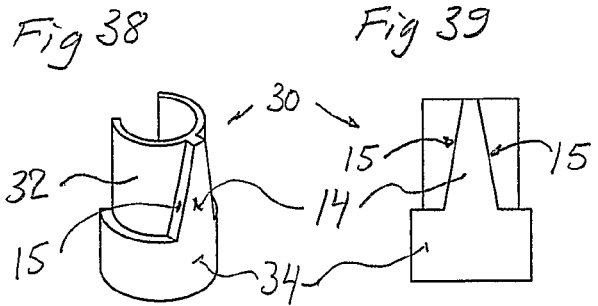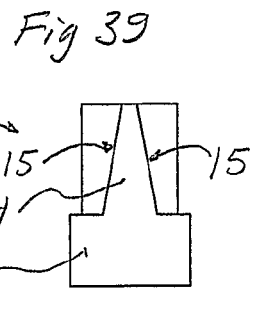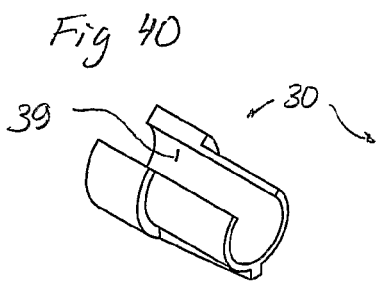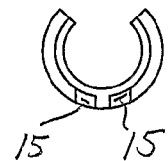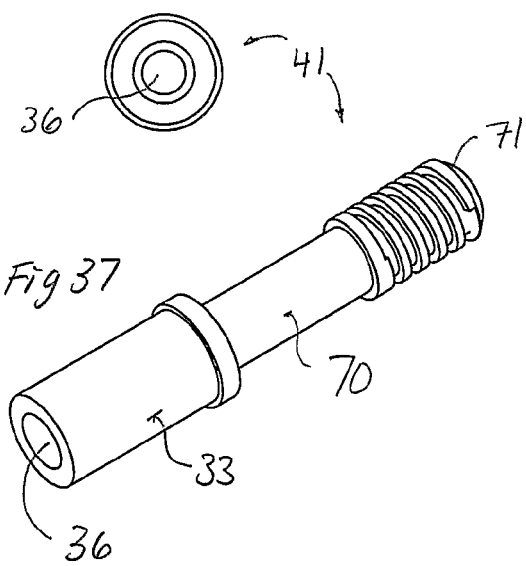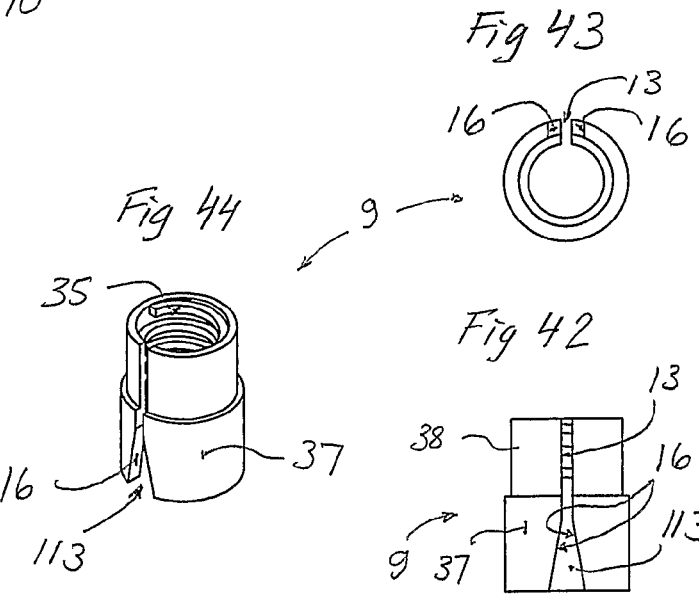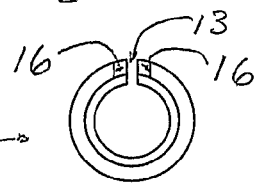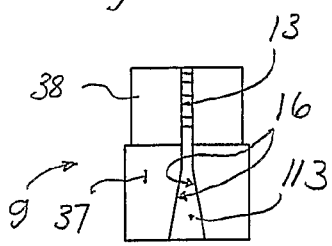

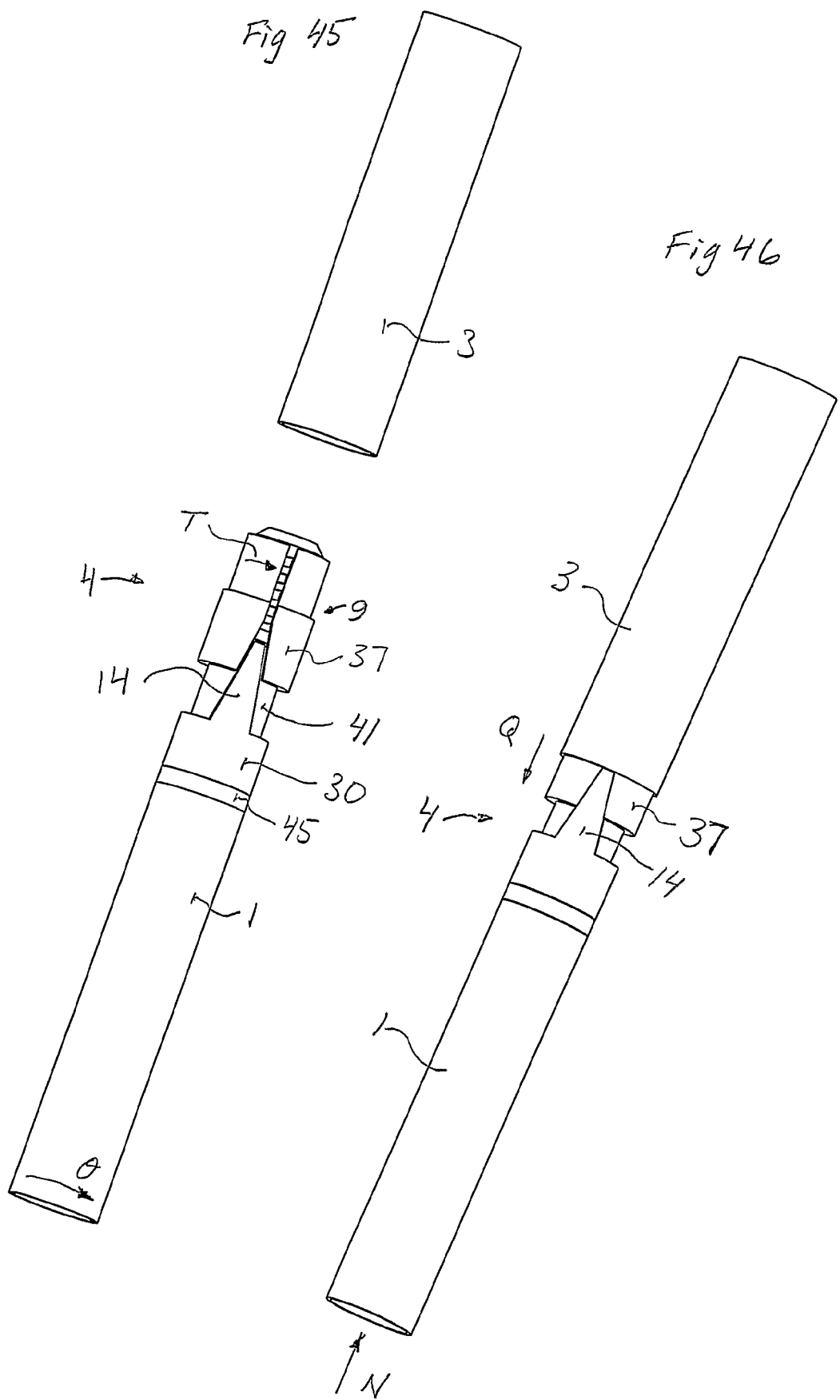

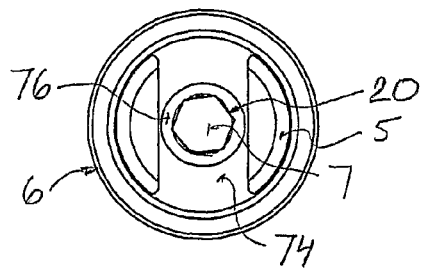
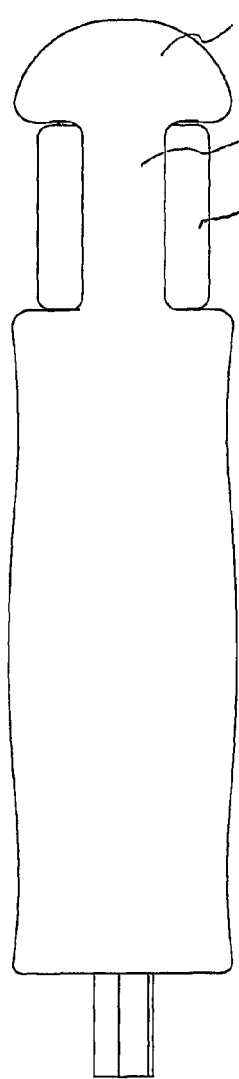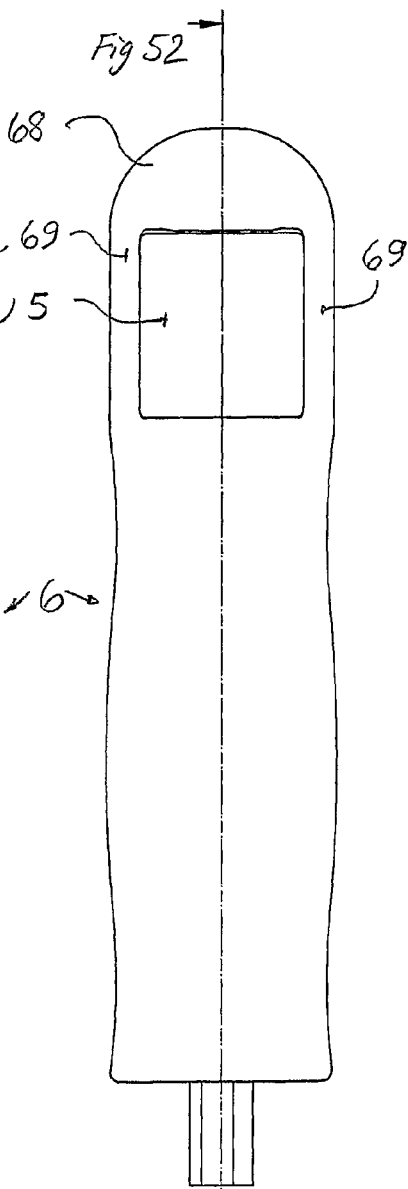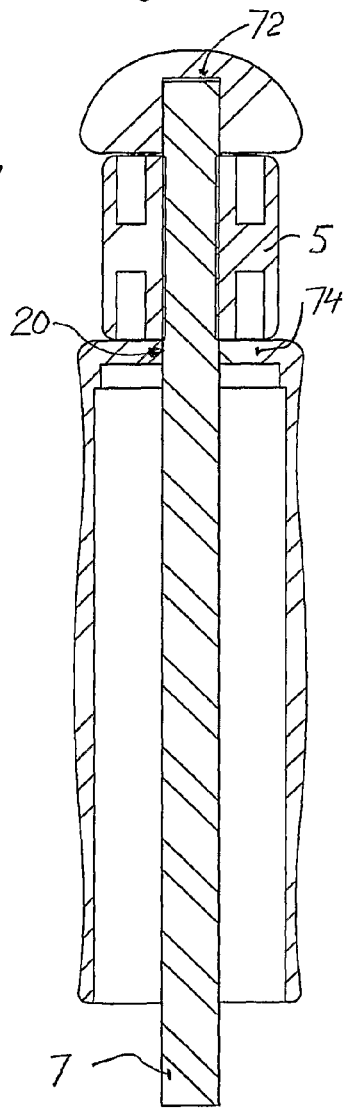

TELESCOPIC LOCK

TECHNICAL AREA

The invention is a locking device that includes an inner element and an outer tube, the inner element having a first free end that projects from and is axially displaceable from a first end of the outer tube, there being a locking member on the other end of the inner element, said locking member serving to releasably lock the inner element and the outer tube in various axial positions relative to each other.

TECHNICAL BACKGROUND

A large number of various locking devices for releasably locking an inner element to an outer tube in various axial positions relative to each other are already known. In principle, these are used in two different areas. These are: stands and supports for taking up principally axial forces; and, tool shafts for taking up not only axial and lateral forces, but also torque. Examples from the first category include furniture legs, various types of sticks, microphone stands, camera stands, ski poles, etc. Examples from the second include shafts for gardening, painting shafts, cleaning shafts, etc.

Functionally, a division can be made into shape-dependent locks and friction-dependent locks. Shape-dependent locks have fixed positions that can be created using holes or transverse slots into which corresponding locking pins can be inserted—see, for example, GB1532723 or WO2005/087329. This type of lock has few parts and may provide a reliable locking function. However, it has the disadvantage that it only allows distinct locking positions. As regards friction-dependent locks, these have the advantage of offering freely selectable locking positions, but the disadvantage that it is more difficult to achieve a reliable locking function using this type of lock. Amongst a large number of different documents, WO2004/090349 can here be mentioned.

A further division can be made on the basis of the locking member's location in relation to the most common main structures, i.e. an outer tube and a therein displaceable inner tube. The locking member can here be: 1) on the end of the inner tube that is inserted in the outer tube—working against the outer tube's inner mantle surface, or 2) on the outer tube's end—working against the inner tube's outer mantle surface, or 3) on the end of an internal tube that is joined to an outer tube inserted into the inner tube—working against the inner mantle surface—see, for example, WO2005/108015.

Yet another division can be made on the basis of the location of the operating member, the most widespread of the locking members here being located on one end of the inner tube and operated by turning the inner and outer tubes relative to each other.

Another known operating principle for a locking member located on one end of the inner tube is to use a non-circular torsion rod that emerges from the outer tube's free end. The locking member has a through-hole for the torsion rod and can thus be displaced axially relative to this. The locking member can be actuated by turning the torsion rod via a rotary knob on the outer tube's free end. US2006/0282988, U.S. Pat. No. 6,361,002, U.S. Pat. No. 6,862,776 and GB2423275 can here be mentioned amongst the more recent documents. All the devices described in these documents use locking bodies that, acted on by the rotary movement, are pressed in a radial direction against the outer tube's inner mantle surface.

As regards tool shafts, it is most usual for the outer tube to point upwards, thereby giving the operator an unbroken gripping surface and a low moment of inertia in respect of sideways movements. Here, it is especially favourable to have an operating member located close to the upper end of the outer tube. The operator does not then have to bend when adjusting shaft length. Examples of such devices are EP1313956 (where the operating member actuates a locking member on the lower end of the outer tube) and WO2005/000305 (where several described designs include a locking member working against the inner tube's inner mantle surface, the locking member being on the lower end of a tube emerging from the upper end of the outer tube). A locking member as per FIGS. 44-49 can be mentioned in particular here. This has a tubular locking sleeve slotted by a longitudinal slot in the form of a wedge-shaped cut-out. Two axially opposed wedges work in a tangential direction in this slot. Operated by small forces exerted via a spring-loaded push rod, this locking member is self-locking in both directions without having to employ special friction materials. Irrespective of this, it is easy to release (provided that the shaft is not axially loaded). The locking device thereby demonstrates considerable advantages over the majority of other friction-dependent locking devices. The latter are unsuitable for demanding applications. This is because of insufficient locking forces despite large operating forces. These latter make it extremely difficult to offer an easy-to-use and reliable operating function. However, the locking device described in WO2005/000305 suffers from disadvantages in the form of an extra inner tube and complicated assembly. It can also be mentioned that the lock is of the disconnection type. Of course, this is excellent as regards operation but, for it to take up a spontaneously locked position, requires the engagement of a spring. A further disadvantage is that the operating member does not have full control over the lock—it cannot be disconnected when the shaft is axially loaded.

EXPLANATION OF THE INVENTION

The purpose of the present invention is that it should result in a device as set out in the ingress, said device giving a reliable and easy-to-operate locking function while also enabling manufacture at a substantially lower cost than that of already known variants.

A further purpose is that it should result in a device as set out in the ingress, said device, via the operating member, giving full control of locking.

These purposes are achieved by a device, as set out in the ingress, where the locking member includes a tubular locking sleeve slotted by an axially aligned slot that has a wedge-shaped cut-out with essentially tangentially aligned wedge surfaces facing each other and a wedge with wedge surfaces, said wedge surfaces, when acted on by a "drive member", being displaceable along and relative to the locking sleeve's interacting wedge surfaces, said displacement pressing the locking sleeve against the outer tube and thereby axially locking the inner element and the outer tube relative to each other, the displacement being effected by rotating the drive member around an axis that is essentially parallel with the outer tube's longitudinal axis.

The invention will now be described with reference being made to the attached drawings, which are intended to explain the invention and not to limit it.

FIG. 1 shows, in perspective, a tool shaft with a locking device as per the invention.

FIG. 2 shows a cross section of an outer tube.

FIG. 3 is a side view showing a handle for the tool shaft in FIG. 1.

FIG. 4 is a view, from above, of the handle in FIG. 3.

FIG. 5 shows a cut-away of the handle (section A-A) in FIG. 3.

FIG. 6 is a view, from below, of an operating member for the tool shaft in FIG. 1.

FIG. 7 is a side view of the operating member in FIG. 6.

FIG. 8 shows the operating member in FIG. 7 in perspective, obliquely from below.

FIG. 9 is a side view of a handle as per FIG. 3 with, mounted therein, an operating member as per FIG. 7 with a torsion rod connected to the operating member, said torsion rod being truncated in the figure.

FIG. 10 shows a cut-away of the arrangement (section A-A) in FIG. 9.

FIG. 11 is a side view showing a wedge member.

FIG. 12 is a view, from below, of the wedge member in FIG. 11.

FIG. 13 shows a cut-away of the wedge member (section A-A) in FIG. 11.

FIG. 14 shows the wedge member in FIG. 11 in perspective, obliquely from above.

FIG. 15 is a side view showing a locking sleeve slotted with an axially aligned wedge-shaped slot.

FIG. 16 is a view, from the left, showing the locking sleeve in FIG. 15.

FIG. 17 shows the locking sleeve in FIG. 15 in perspective, obliquely from the left.

FIG. 18 is a side view of a drive member that includes a thread.

FIG. 19 shows a cut-away of the drive member (section B-B) in FIG. 18.

FIG. 20 is a view, from the right, of the drive member in FIG. 18.

FIG. 21 shows the drive member in FIG. 18 in perspective, obliquely from the left.

FIG. 22 is a side view of a locking member, as per the invention, partly mounted and with a truncated torsion rod.

FIG. 23 is a view, from the left, of the locking member in FIG. 22.

FIG. 24 shows the locking member in FIG. 22 in perspective, obliquely from above.

FIG. 25 shows the locking member in FIG. 22 in perspective, obliquely from below.

FIG. 26 is a side view showing parts of the locking member, a truncated torsion rod, a truncated inner tube and a partly exposed and truncated outer tube.

FIG. 27 is a partly exposed side view showing interacting internal parts of the locking member.

FIG. 28 is a partial enlargement of the exposed detail in FIG. 27.

FIG. 29 is a view, from below, of an alternative design of an operating member.

FIG. 30 is a side view, from the left, of the operating member in FIG. 29.

FIG. 31 shows the operating member in FIG. 29 in perspective, obliquely from below.

FIG. 32 is an exposed side view of an alternative design of a handle.

FIG. 33 is a view, from above, of the handle in FIG. 32.

FIG. 34 is a partly exposed side view of a handle as per FIG. 32 with, mounted therein, an operating member as per FIG. 29 with a torsion rod connected to the operating member, said torsion rod being truncated in the figure.

FIG. 35 is a side view of an alternative design of a drive member.

FIG. 36 is a view, from above, of the drive member in FIG. 35.

FIG. 37 shows the drive member in FIG. 35 in perspective, obliquely from above.

FIG. 38 shows, in perspective obliquely from below, a wedge member that mates up with the drive member in FIG. 35.

FIG. 39 is a side view of the wedge member in FIG. 38.

FIG. 40 shows the wedge member in FIG. 38 in perspective, obliquely from below, at a different angle.

FIG. 41 is a view, from above, of the wedge member in FIG. 39.

FIG. 42 is a side view of a locking sleeve that mates up with the wedge member in FIG. 38.

FIG. 43 is a view, from below, of a locking sleeve as per FIG. 42.

FIG. 44 shows the locking sleeve in FIG. 42 in perspective, obliquely from above.

FIG. 45 shows, mounted, a locking member as per FIGS. 35, 38 and 42 with a mounted inner tube and an outer tube, all in perspective, obliquely from the side.

FIG. 46 shows, in perspective from the side, an arrangement as per FIG. 45 with the outer tube partly fitted and the locking member in a locked position.

FIG. 50 is a view, from below, of a handle with an operating member and torsion rod.

FIG. 51 is a side view of the handle in FIG. 50.

FIG. 52 is a view, from the left, of the handle in FIG. 51.

FIG. 53 is an exposed view, from the left, of the handle in FIG. 52.

Figure 47:
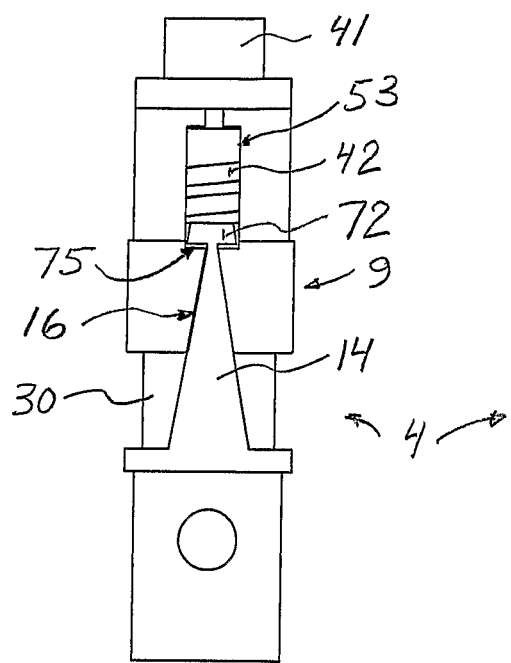
FIG. 47 is a side view of a variant of a mounted locking member as per the invention.

FIG. 1 shows a locking device as per the invention used with a tool shaft (10) that includes an outer tube (3), an inner element (1), a stop bushing (17), a locking member (4), a torsion rod (7), a handle (6) and an operating member (5). The inner element (1) is, in this case, an inner tube and includes, in this design, a tool mount (2) at its lower free end, said tool mount comprising, in its simplest form, radially aligned holes. The handle (6) is fastened to the upper part of the outer tube (3). On the upper part of the handle, the operating member (5) is arranged in a way that allows it to rotate. The torsion rod (7) is fastened to the operating member (5) and thus rotates when the operating member (5) is turned. Such turning acts upon the locking member (4), which is more closely described below.

FIG. 2 shows a cross section of the outer tube (3). On the inner mantle surface (11) there are shoulders (8) that run in an axial direction along the outer tube (3). It is preferred that the outer tube should be made of extruded aluminium, but an outer tube made of a different material and in a different way can also be envisaged, e.g. a steel tube with shoulders pressed inwards from the outside. These shoulders (8) serve as an anti-rotation lock for the inner element (1). Such an anti-rotation lock can, of course, be in the form of another non-circular design of the outer tube's cross section. However, it is preferred that the cross section's inner mantle surface includes circular parts.

The handle (6) in FIGS. 3-5 includes a neck (12) with axially aligned guide grooves (18) designed to receive the shoulders (8) on the outer tube (3). The handle (6) further includes an axially aligned through-hole (20) that, in the handle's upper end develops into a cylindrical guide hole (19) via a ring-shaped, axially aligned, stop surface (21). The handle (6) can appropriately be manufactured from an injection moulded polymer and provided with cut-ins (22). The guide hole (19) is designed to receive a cylindrical neck (24) on an operating member (5). As shown in FIGS. 6-8, this operating member (5) can appropriately be manufactured as a single part (injection moulded polymer). It includes a rotary knob (23) and a cylindrical neck (24) that has a slightly smaller diameter than the guide hole (19). In the neck (24), there is a central, hexagonal mounting hole (25). The torsion rod (7), which has a corresponding hexagonal cross section, is inserted into this hole and secured axially in an appropriate manner. The lower part of the neck (24) is axially slotted with gaps (27), thereby creating tongues (26). In the lower part of this neck (24), the hole (25) is enlarged, thereby creating edges 28. Thus, when torsion rod (7) is introduced into the upper part of the hole (25), a gap is created between the torsion rod and the inside of the tongues (26). The tongues (26) can then move resiliently in towards the centre. The lower part of the tongues (26) includes outward pointing bevelled shoulders (29). At assembly, the operating member (5) is joined to the torsion rod (7). The latter is then inserted into the guide hole (19) until these shoulders (29) come into contact with the upper edge of the guide hole (19). Acted on by the insertion bevels of the shoulders (29), the tongues move resiliently in towards the centre, this allowing the shoulders (29) to be introduced into the hole (19) of the handle and snap securely into place against the stop surface (21). In this way, the operating member (5) with the torsion rod (7) fitted can be secured axially to the handle (6)—as shown in FIGS. 9 and 10. Owing to a certain axial and radial play between the operating member (5) and the handle (6), the operating member (5) and, consequently, the torsion rod (7) can be rotated in the arrows' M directions relative to the handle (6). FIGS. 9 and 10 also show parts of an outer tube that has been fitted onto the neck (12) of the handle (6). The shoulders (8) of the outer tube are thereby pushed into corresponding slots (18) in the neck (12). In addition, the outer tube is fastened to the neck (12) in an appropriate manner, e.g. a radially aligned screw. This means that both rotary and axial movements can be transmitted from the handle (6) and the outer tube (3).

FIGS. 11-21 show the constituent parts of the locking member (4). A wedge member (30) as per FIGS. 11-14 can appropriately be made as a single part (an injection moulded polymer—e.g. polyamide). The wedge member (30) is essentially tubular and includes: a mounting neck (33) designed to be inserted into and fastened to the inner element (1); a guide pin (32); and, between the mounting neck and the guide pin, a stop flange (34), which serves as a stop for the inner element (1). The outer mantle surface of the guide pin (32) includes a projection in the form of a wedge (14) with a guide groove (31). The wedge (14) has two wedge surfaces (15) that are essentially tangentially aligned and face away from each other at a certain angle. The wedge member (30) also includes a through-hole (36) that, in the guide pin (32), has an internal thread (35).

The locking member (4) also includes a tubular, essentially cylindrical locking sleeve (9) that is slotted with an axially aligned slot (13)—as per FIGS. 15-17. A one of its ends, this slot (13) develops into a wedge-shaped cut-out (113) with wedge surfaces (16) that face each other and are essentially tangentially aligned. The locking sleeve includes a section, with a larger outside diameter, that forms a locking surface (37). It also has a section, with a slightly smaller diameter, that forms a neck (38). There is an axially aligned slot (13') in the locking surface (37) on the opposite side of slot 13. The inside diameter of the locking sleeve forms a guide surface (39) designed to interact with the guide pin (32) of the wedge member (30). The locking sleeve (9) also includes shoulders (40) that run from the outer end of the neck (38) and are radially aligned in towards the centre. The end edges of the shoulders (40) are essentially circular and have a certain diameter, "d". The locking sleeve is preferably manufactured as a single part in an appropriate material, e.g. acetal plastic. The material should be flexible but keep its shape and have a low friction coefficient when interacting with the wedge member (30). The locking member (4) also includes a drive member (41), as per FIGS. 18-21. Said drive member is preferably manufactured as a polymer (e.g. polyamide) that is injection moulded. The drive member (41) includes a cylindrical neck (49). On said neck, there is an external thread in the form of a thread groove (42). With a certain radial and axial play, the external thread mates up with the internal thread (35) of the wedge member (30). The thread groove (42) runs from the end of the neck (49) and terminates with an axially aligned edge (48). At a distance from the edge (48), the neck (49) has a reduction in diameter that forms a slot (43) with a lower stop surface (44) and an upper stop surface (46), said stop surfaces being ring-shaped and essentially axially aligned. The outside diameter of the slot (43) is somewhat less than the diameter ("d") of the end edges of the shoulders (40) of the locking sleeve (9). The upper stop surface (46) forms an end surface of a flange (45) that has an outside diameter that is approximately the same as the outside diameter of the neck (38) of the locking sleeve (9). The drive member (41) further includes a through-hole (47) with a cross section (in this case, hexagonal) that is the same shape as that of the torsion rod (7), but which is slightly larger. This is so that the torsion rod (7) can run freely through the hole (47) and still turn the drive member. The important thing here is that the cross section is not circular. A rotary movement can thus be transmitted from the torsion rod (7) to the drive member (41), such movement thereby actuating a locking device. This actuation is explained more closely below.

FIGS. 22-25 show the locking member (4) partly fitted with a torsion rod (7) that has been inserted therein. The assembly order is as follows. The shoulders (40) on the locking sleeve (9) are turned towards the end of the neck (49) of the drive member (41), pulled over the neck and snapped securely in place in the slot (43). This requires that the locking sleeve (9) allows itself to be slightly widened. This is possible because the locking sleeve is slotted and made of a flexible material. Because the outside diameter of the slot (43) is somewhat less than the diameter ("d") of the end edges of the shoulders (40) of the locking sleeve (9), the locking sleeve (9) can rotate freely relative to the drive member (41). The width of the slot (43) is such that, with a certain axial play, the shoulders (40) fit into the slot. The torsion rod (7) can then be pushed into the hole (47) in the drive member (41). In this hole, the torsion rod (7) can then be displaced axially with a certain play (as previously explained). The torsion rod is also inserted through the through-hole (36) of the wedge member (30). In this hole, the torsion rod can be freely rotated and axially displaced. The wedge member (30) is then turned so that the guide pin (32) faces the locking sleeve (9) and the drive member (41).

In the next stage, the drive member (41) is screwed into the wedge member (30) whereby, with a certain play, the guide surface (39) of the locking sleeve (9) slides against the guide pin (32) of the wedge member (30).

FIGS. 26-28 show the locking member in an unlocked position and fully fitted. A section of the outer tube (3) is exposed. The inner tube (1) is fitted to the mounting neck (33) of the wedge member (30). Thanks to a gap (50) between the locking surface (37) of the locking sleeve (9) and the inner mantle surface (11) of the outer tube (3), the inner tube (1) with the fitted locking member (4) can be displaced axially relative to the outer tube (3). On axial displacement, the outer tube's shoulders (8) slide in the guide groove (31) of the wedge member (30) and in the axially aligned slots (13 and 13') of the locking sleeve (9). Via this arrangement, the inner tube (1) is anti-rotation locked with the locking member (4) relative to the outer tube (3). FIG. 26 shows the wedge (14) of the wedge member (30) partly pushed into the wedge-shaped cut-out (113) of the locking sleeve (9). Turning the torsion rod (7) in the arrow's 0 direction (because of the right-hand thread) screws the drive member (41) into the wedge member (30). During this turning, the upper flank (52) of the thread groove (42) of the drive member (41) is supported against the lower flank (51) of the thread (35) of the wedge member (30)—FIG. 28. Axial play between the thread groove (42) and the thread (35) gives rise to the formation of a gap, A, between the lower flank of the thread groove (42) and the upper flank of the thread (35). When the drive member (41) is thus screwed into the wedge member (30), the flange (45) presses that end of the locking sleeve (9) which has the shoulders (40) in the arrow's Q direction—FIG. 27. The wedge (14) of the wedge member (30) is thereby pushed further into the wedge-shaped cut-out (113) of the locking sleeve (9). Consequently, the wedge surfaces (15) of the wedge (14) move along and relative to interacting wedge surfaces (16) on the locking sleeve (9). This widens the axial slots (13) of the locking sleeve (9). The result of this is that the diameter of the locking sleeve (9) increases and its locking surface (37) is pushed radially in the arrows' R direction until said locking surface (37) comes into contact with the inner mantle surface (11) of the outer tube (3), thereby axially locking the inner tube (1) and the outer tube (3) relative to each other. By choosing an appropriate angle between the wedge surfaces (15) of the wedge (14), the locking sleeve (9) can be self-locking against the outer tube (3). When the inner tube (1) is pressed against the outer tube (3) in the arrow's N direction, the movement of the outer tube (3) pushes the locking sleeve (9) in the arrow's Q direction. The wedge member (30) is then displaced in the arrow's S direction (FIG. 28) relative to the locking sleeve (9). This is possible because of the earlier explained gap, A. Through this relative displacement of the wedge member (30) against the locking sleeve (9), the wedge surfaces (15) of the wedge (14) move along and relative to interacting wedge surfaces (16) on the locking sleeve (9). This further widens the axial slots (13) of the locking sleeve (9) and, as a consequence, strengthens the locking function. With no requirements in respect of special friction materials for the locking surface (37) of the locking sleeve (9), this occurs provided the angle between the wedge surfaces is not greater than approximately 20 degrees. Gap A can then be less than 1 mm, this low value being important to achieve operation that is as controllable as possible. A small gap height for A is conditional on active locking components being rigid and having little springiness. This is because, with a wedge angle of 20 degrees, a 1 mm displacement of the wedge (14) entails only an approximately 0.1 mm diameter increase of the locking sleeve (9). The combination of turning the drive member (41) along a thread and the wedge (14) working essentially tangentially against the wedge-shaped cut-out (113) of the locking sleeve (9) also lead to a very good locking function when the outer tube (3) and the inner tube (1) are pulled out from each other. A surprisingly good locking function under an extractive force is also obtained when drive member (41) is rotated with a low torque in a steeply pitched thread. With a 20-degree wedge angle, the pitch can be as great as 12 mm. This means that locking member (4) can go from a fully open to a fully closed position with an angle of rotation of no more than 90 degrees and with so little torque that the operation can be carried out with such easy movements of the operator's fingers that the wrist does not need to be turned. From the point of view of ergonomy, this is excellent—repeated turning of the wrist often leads to wear damage. Operation is effected by the operating member (5) in FIG. 10 being turned in one of the arrows' M directions. When the locking member (4) is to go into the locked position, the operating member is turned clockwise (the arrow's 0 direction in FIG. 27) relative to the handle (6).

Via the torsion rod (7), this turning is transmitted to the drive member (41). As, via the shoulders (8), the wedge member (30) is anti-rotation locked to the outer tube (3), the drive member (41) is, as previously explained, screwed into the wedge member (30). When the lock is to be opened, the operating member (5) is turned anticlockwise (the arrow's P direction in FIG. 27). Via the torsion rod (7), this turning is transmitted to the drive member (41), which is screwed out of the wedge member (30). The locking sleeve (9) is here drawn out of the wedge (14) by the lower stop surface (44) in the slot (43) of the drive member (41) exerting force on the shoulders (40). In this way, full control of the locking member (4) is obtained via the operating member (5). The described device/arrangement comprises few parts and is simple to assemble. This leads to low production costs. In the described design, the torsion rod (7) is a hexagonal rod. It can, of course, have a different non-circular cross section that requires less material. For example, an aluminium profile in the form of a thin-walled pipe with outward pointing shoulders could be imagined. A profile in a reinforced polymer is another possibility. A design without anti-rotation locking of the wedge member (30) and where the outer tube (3) has a circular cross section can also be imagined. As the torque when the drive member (41) screws into the wedge member (30) is low, friction or the inertia that arises when a tool is connected to the tool mount (2) is often enough to give the counter torque necessary for operation.

If a steep pitch is chosen, the thread is not self-locking and it is then preferred that the operating member includes a catch device as per FIGS. 29-34.

The operating member (5) is here appropriately manufactured as a single part (injection moulded polymer) and includes, as per FIGS. 29-31, a relatively thin cylindrical disc (58) slotted with radial slots (56) through which tongues (55) on the disc (58) protrude. On one side of the disc (58), and concentric therewith, a neck (24) is fitted. This has exactly the same design and function as the neck (24) previously described in connection with FIGS. 6-8. On the other side of the disc (58), there is a knob (59). This is symmetrically stretched across a diameter line on the disc (58). The knob includes radially aligned cavities (60) and is oriented so that the cavities (60) lie above and cover the tongues (55) and the slots (56). The tongues (55) can thus be freely bent into the cavities (60). At the transition between the neck (24) and the disc (58), there is a cylindrical flange (61). The tongues (55) include projections (57). These have a triangular cross section and extend radially from the flange (61) out towards the circumference of the disc (58). The neck (24) also includes a radially aligned hole (54) for a pin or a screw designed to fasten the torsion rod (7) in an axial direction. The handle (6) is appropriately manufactured as a single part (injection moulded polymer) and includes, as per FIGS. 32 and 33, a neck (12) and a head (66). The handle (6) further includes guide grooves (18), a through-hole (20), a guide hole (19) and a stop surface (21). The design and function of these is as previously described in connection with FIGS. 3-5. In the head (66), there is a recess (62). The outer part of this recess is cylindrical with a diameter that is slightly larger than that of the disc (58) on the operating member (5). The cylindrical part of the recess (62) is concentric with the guide hole (19). At its lower part, the recess (62) develops into a rotationally symmetric cut-in (22). A tube (67) rises from the bottom of this cut-in (22). The inner mantle surface of this tube forms a part of the guide hole (19); its upper end surface (64) is designed to support the lower end surface of the flange (61) of the operating member (5). At the bottom of the cylindrical part of the recess (62) and along its circumference there is a tooth rim (63). The teeth here have a triangular cross section and are designed to interact with the projections (57) on the tongues (55) of the operating member (5). FIG. 34 shows how the handle (6) and the operating member (5) interact in a catch device (65). The torsion rod (7) is fitted in the operating member (5) in the same way as previously described. The torsion rod (7) is then inserted through the handle's guide hole (19), after which, as previously described, the neck (24) of the operating member (5) snaps securely into place against the stop surface (21). In this position, the operating member (5) is locked axially with a certain play between the stop surface (21) and the support surface (64). This play is so adapted that the projections (57) fit into the spaces between the teeth in the tooth rim (63) and thus, with a certain braking moment, lock the operating member (5) from turning relative to the handle (6). In the locking member, it is thus possible to use a thread that is not self-locking and thereby achieve a very easy to operate locking function. When turning the knob (69) in any of the arrows' O and P directions with a greater torque than the braking moment, the projections (57) slide over the teeth in the tooth rim (63) thanks to the triangular cross sections. The tongues (55) are then bent in the arrow's T direction into the cavity (60). The magnitude of the braking moment can be tailored via the flexural rigidity of the tongues (55) or via alternating the shape and size of the cross section of the projections (57) and the teeth in the tooth rim (63). A catch device (65) can, of course, have a large number of different designs. It can, for example, be friction-dependent or designed to have a catch that is to be actively actuated at disconnection. To ensure that the projections (57) are pressed down towards the tooth rim (63) with appropriate force, it is also possible to envisage the engagement of separate, metal, spring elements. In the above-described design, the operating member (5) is recessed in the recess (62) of the handle (6). The advantages of this are that the operator can easily get at the operating member (5) and, without risking involuntary actuation of the operating member, can manipulate the shaft (10) using the handle (6). Within the framework of the invention, many other locations and designs of the operating member can, of course, be envisaged. One advantageous arrangement could, for example, be to have the operating member (5) located on the outer end of the inner element (1) in a way that allows said member to rotate, the torsion rod (7) here not being displaced axially relative to the drive member (41) but being permanently fitted in this. Another possibility is for the operating member (5) to be so designed that it converts a linear movement of the operator's hand into a rotation of the torsion rod (7). This can be achieved by having the operating member include a toothed rack that operates against a gear on the torsion rod. In such a design, the operating member can be pushed towards and away from the outer tube in a radial direction when operating the locking member. Another design is to provide: the upper part of the torsion rod (7) with a steeply pitched screw drive; and, the operating member (5) with a nut that has the same thread. The locking device can then be operated by the operating member being pressed in towards the outer tube in a radial direction. A compression spring can be used to achieve spring-back. The drive member (41) can be varied in such a way that its design has bendable tongues with locking shoulders in the end that is screwed into the wedge member. Said shoulders can hook securely onto the end edge of the through-hole (36) in the wedge member (30) and prevent the drive member (41) being entirely screwed out of the wedge member (30). The length of the tongues must be such that operation of the locking member (4) is not prevented.

FIGS. 35-44 show the constituent components of another design of a locking device, as per the invention, with a locking member (4). This locking member includes a drive member (41) as per FIGS. 35-37. Said member can appropriately be manufactured as a single part in an injection moulded polymer that has high rigidity and strength (e.g. a glass-reinforced polyamide). The drive member (41), which is as rotationally symmetric to the thread groove (42) as possible, has a through-hole (36) and, at one end, includes: a mounting neck (33) for fastening to an inner element (1); a flange (45) that demarcates, on one side, a stop surface for the inner element (1) and, on the other, a stop surface for a wedge member (30); and, a guide neck (70) that develops into a neck (49) with a diameter greater than that of the guide neck. On the neck (49), there is an external thread in the form of a thread groove (42). The thread groove (42) terminates in an axially aligned edge (48) in the neck (49), said neck developing into a penetrating bevel (71) at the other end of the drive member (41). The locking member (4) further includes a wedge member (30) as per FIGS. 38-41. Said wedge member can appropriately be manufactured as a single part (glass-reinforced polyamide). The wedge member (30) is designed as a cut-open cylindrical tube with a large and a small outside diameter. The section with the larger diameter forms a stop flange (34), the outer end of which is designed to give support against the flange (45) of the drive member (41). The section with the smaller outside diameter forms a guide pin (32) for guiding a locking sleeve (9). On the mantle surface of the guide pin (32), there is a wedge (14) with essentially tangentially aligned wedge surfaces (15) at a certain angle (preferably around 20 degrees) from each other. The inner mantle surface of the wedge member (30) forms a guide surface (39) with a similar diameter to the outside diameter of the guide neck (70) of the drive member (41). The wedge member (30) is designed to snap-fit to the guide neck (70) between the flange (45) and the neck (49) with an axial and radial fit that allows it to be easily rotated on the guide neck.

The locking member (4) also includes a locking sleeve (9) as per FIGS. 42-44. Said sleeve is preferably manufactured in acetal plastic, this material having good anti-friction properties against polyamide plastics. The locking sleeve (9) is designed as a cylindrical tube with a large outside diameter at one end and a small outside diameter at the other end. The large diameter end forms a locking surface (37) for interacting with the inner mantle surface of an outer tube (3). When the locking sleeve is not loaded, the diameter of the locking surface (37) is larger than the inside diameter of the outer tube (3). The other end forms a neck (38) with a smaller outside diameter. The inner mantle surface of the neck (38) has a thread (35) that is designed to interact with the thread groove (42) of the drive member (41), the fit being such that it can easily rotate with a certain axial play. The locking sleeve is slotted by an axially aligned slot (13) that, at the end with the locking surface (37), develops into a wedge-shaped cut-out (113) that has essentially tangentially aligned wedge surfaces (16) that face each other. The inside of the locking surface (37) of the locking sleeve (9) provides a guide surface designed to enclose the guide pin (32) on the wedge member (30), the fit being such that the locking sleeve can be easily displaced axially relative to the wedge member (30). Such displacement is accomplished via the drive member (41), which is more closely described below.

FIG. 45 shows a fitted locking member (4) with an inner tube (1) fastened (using known technology) to the mounting neck (33) of the drive member (41). The wedge member (30) has been snapped onto the guide neck (70) of the drive member (41) and can be easily rotated on this. The locking sleeve (9) has also been fed over the penetrating bevel (71) of the drive member (41), the orientation being such that the wedge (14) of the wedge member (30) has been pushed into the wedge-shaped cut-out (113) of the locking sleeve (9) and then screwed into the thread groove (42). This penetration is accomplished through the widening of the locking sleeve. Said widening is facilitated by the thinner material thickness of the neck (38) as a result of the neck's smaller outside diameter. In this position, when the locking sleeve (9) is rotated, it is displaced axially relative to the wedge member (30), said wedge member also rotating because the wedge (14) is inserted in the wedge-shaped cut-out (113). When the locking sleeve (9) is screwed in the arrow's T direction (right-hand thread) the terminating edge (48) of the thread groove (42) stops it on the drive member. In this position, the wedge (14) does not affect the diameter of the locking sleeve (9) and the outer tube (3) can be pushed over the locking sleeve with a certain friction. Said friction arises from the diameter of the locking surface (37) being slightly greater than the inside diameter of the outer tube (3). In this position, the inner tube (1) and the outer tube (3) can thus be displaced axially relative to each other. Locking of the locking member (4) occurs through the inner tube (1) being rotated, relative to the outer tube (3), in the arrow's 0 direction. In such rotation, owing to the friction of the locking surface (37) against the inner mantle surface of the outer tube (3), the locking sleeve (9) is screwed down towards the wedge member (30). This pushes the wedge (14) further into the wedge-shaped cut-out (113) of the locking sleeve (9). As a result, the wedge surfaces (15) of the wedge (14) move along and relative to interacting wedge surfaces (16) on the locking sleeve (9). This widens the axial slots (13) of the locking sleeve (9). Consequently, the diameter of the locking surface (37) increases and the locking sleeve goes into locking engagement with the inner mantle surface of the outer tube (3). This further entails that the diameter of the thread (35) increases and the flanks of the thread (35) and the thread groove (42) slide in a radial direction relative to each other. The height of the thread profile must here be sufficient to allow such a relative difference in diameters (which can be up to 0.5 mm). This locking is self-locking on displacement of the inner tube (1) relative to the outer tube (3) in the arrow's N direction. This is because the locking sleeve (9) then tends to be displaced in the arrow's Q direction relative to the wedge (14), with a further diameter increase as a consequence. This is possible because of the axial play in the thread. This locking principle has been previously explained in detail and an overview is given in FIG. 46 where, for the sake of clarity, the outer tube (3) has only been partly slipped over the locking member (4). With an opposite displacement direction of the inner tube (1) relative to the outer tube (3), self-locking does not arise. However, a surprisingly strong locking function is achieved with only a small torque and the lock is, therefore, very easy to operate. It is here preferred that the thread groove (42) and the thread (35) have a considerably smaller pitch than in the previously described design. The pitch should be so small that the thread is self-locking and, consequently, the locking member (4) does not open involuntarily. With a pitch of around 3 mm, the locking member can be operated between the fully open and the fully closed position with an angle of rotation of about 270 degrees and with so little torque that the operation is very easy to perform. This type of locking is especially appropriate in applications where no, or only a small, torque is to be transmitted between the inner element and the outer tube. Areas of use that can be envisaged include various types of sticks (e.g. walking sticks and ski poles) and various types of stands (e.g. for cameras and microphones). Boathooks are a further area of use. The lock contains only one part more than traditional and very common types of lock with the same operating principle. However, it gives a locking function that is vastly superior to theirs.

In the above, the locking device is described in connection with an inner element (1) in the form of an inner tube. However, as the lock is operated without a torsion rod that passes all the way through, it can, of course, employ an inner element (1) in the form of a solid rod. It is further obvious that also this design of the locking device can be provided with a handle and some type of tool or mount. The above-described design can also be varied so that the locking sleeve has no thread and, instead, the drive member interacts with a cylindrical nut of a slightly larger outside diameter than that of the outer tube, said nut being connected to the locking sleeve so that rotary and/or axial movements are transmitted.

Figure 48:
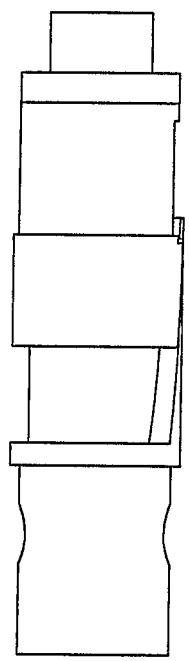
FIG. 48 is a view, from the left, of the locking member in FIG. 47.
Figure 49:
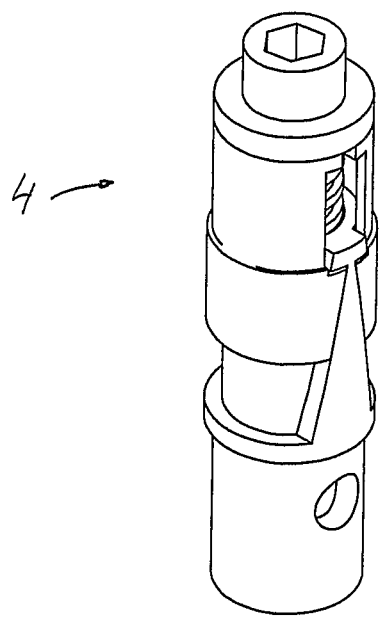
FIG. 49 shows the locking member in FIG. 47 in perspective, obliquely from above.

The invention can be further varied as per FIGS. 47-53, which show a design with an alternative operating member. FIGS. 47-49 show various views of a locking member (4) where the drive member (41) has a thread groove (42) with such a small pitch that the thread is self-locking This brings the advantage that the operating member (5) does not require a catch device. FIG. 47 also shows how, at its narrowest end, the wedge (14) of the wedge member (30) has a stop member (72) in the form of two tangentially aligned bars. This stop member runs freely in a cut-out (53) in the locking sleeve (9). The cut-out (53) terminates in tangentially aligned edges (75) at the transition to the wedge surfaces (16). This prevents the drive member (41) being screwed out of the wedge member (30). On assembly, the locking sleeve (9) widens when the angled edges of the stop member (72) are pressed into the locking sleeve's wedge groove. Continuing to screw the drive member (41) into the wedge member (30) causes the stop member (72) to slide into the cut-out (53) of the locking sleeve, the wedge surfaces (16) of the locking sleeve then snapping securely into place against the corresponding wedge surfaces of the wedge (14). This design of a locking member also lacks guide grooves for anti-rotation locking, the inner tube (1) thus being freely rotatable relative to the outer tube (3) when the locking member (4) is unlocked. This facilitates fitting and, as the outer tube (3) can be a standard tube, reduces manufacturing costs. Because the drive member (41) can be easy to screw into the wedge member (30) and the inertia of the inner tube (1) can counteract rotation of the drive member (4) relative to the outer tube (3), rotatability is not in itself, an inconvenience during operation.

Thanks to the small pitch of the thread groove (42) of the drive member (41), the locking member (4) can be operated with insignificant torque. FIGS. 50-53 show various views of a handle (6) with an operating member (5) and a torsion rod (7). Naturally enough, having the operating member (5) on top of the handle (6), as in previously described designs, can also be envisaged. However, the disadvantage of such an arrangement is that the operating member (5) can be opened involuntarily when working with the shaft (10). To eliminate this disadvantage, the operating member (5) can be recessed in an opening in the handle (6)—as shown in FIGS. 50-53.

The handle (6) includes a lower part, into which the outer tube (3) is designed to be introduced, and an upper part with an upper end piece (74) that includes a through-hole (20) into which the torsion rod (7) can be introduced and freely rotated. At the lower end of the end piece (74), the through-hole (20) has a penetrating bevel (76) for the torsion rod (7). Two upward pointing bars (69) supporting a terminating cap (68) rise from the lower part of the handle (6). This cap (68) is thus integrated with the lower part of the handle (6). As shown by the exposed side view in FIG. 53, the cap (68) includes a base hole (72). Said base hole (72) serves as a guide hole for the torsion rod (7). The torsion rod can rotate freely therein. Between the bars (69), there is a cylinder-shaped, rotatable, operating member (5). As shown in FIG. 53, this latter has cut-ins. In the centre of the operating member (5) there is a through-hole for the torsion rod (7). The torsion rod (7) can be introduced into this through-hole and locked against rotation and axial displacement relative to the operating member (5). On assembly, the operating member (5) is inserted between the bars (69) and then the torsion rod is inserted, from below, into the handle (6). Guided by the penetrating bevel (76), the torsion rod is then inserted into and through the through-hole (20) into the operating member (5). The torsion rod (7) is then inserted into the base hole (72) in the cap (68). Finally, using a radially aligned screw or some other known method, the torsion rod (7) can be secured to the operating member (5). The operating member (5) is now easy to get at for the operator without any risk of involuntary operation of the locking member (4). As the thread pitch in the locking member is considerably less than in earlier designs, a rotation of up to one turn is required between the closed and the open position. This is easily accomplished by two to three single turns between the operator's thumb and index finger. Insignificant torque only is required to achieve very strong locking of the inner tube (1) and the outer tube (3) relative to each other, both against axial movement (in both directions) and against rotation. As the bars (69) prevent the operator enclosing the operating member (5) with a hand, the risk of the locking member (4) being loaded with a damagingly large torque (which could easily have otherwise occurred with a low thread pitch and another type of operating member) is averted. The design described above is a very economical variant of the design.

The invention claimed is:

1. A locking device interacting with a drive member and comprising:
    an inner element (1) and an outer tube (3); wherein the inner element (1) has a first free end that projects from, and is axially displaceable from, a first end of the outer tube;
    a locking member (4) provided on the other end of the inner element (1), said locking member (4) permitting the inner element (1) and the outer tube (3) to be releasably locked at various axial positions relative to each other;
    an axially aligned torsion rod (7); and
    an operating member (5);
    wherein the locking member (4) comprises:
    an axially aligned thread (35),
    a tubular locking sleeve (9) that is slotted by at least one axially aligned slot (13), said slot including a wedge-shaped cut-out (113) with wedge surfaces (16) that are essentially tangentially aligned with the locking sleeve (9), and
    a wedge (14) having wedge surfaces (15), such that when said locking sleeve (9) is acted upon by a drive member (41) having a thread groove (42), said wedge surfaces are displaced along and relative to interacting wedge surfaces (16) of the locking sleeve (9), whereby the locking sleeve (9) is pressed against the outer tube to thereby axially lock the inner element (1) and the outer tube (3) relative to each other,
    and wherein said displacement caused by rotation of the drive member (41) about an axis that is essentially collinear with a longitudinal axis of the inner element (1), which is actuated by the torsion rod (7) being operated by the operating member (5), thereby causing the thread groove (42) to interact with the thread (35).

2. A locking device according to claim 1, wherein the torsion rod (7) has a non-circular cross section; wherein the drive member (41) comprises a non-circular through-hole (47), and wherein the torsion rod (7) is displaced in said through-hole (47) and being capable of being displaced axially relative to the drive member (41) while still turning the drive member (41).

3. A locking device according to claim 1, wherein the drive member (41) is fastened to the inner element (1).

4. A locking device according to claim 1, wherein the locking sleeve (9) is connected to the drive member (41) in such a way that the locking sleeve (9) can be turned relative to the drive member (41) and, with certain axial play, be displaced axially relative to the wedge (14).

5. A locking device according to claim 1, wherein the outer tube (3) has an axially oriented shoulder (8) on its inner mantle surface (11), and the locking sleeve (9) includes an axially aligned slot (13'), in which axially aligned slot (13') the shoulder (8) slides on axial displacement of the inner element (1) relative to the outer tube (3).

6. A locking device according to claim 5, wherein the pitch of the thread (35) is sufficiently steep that it is not self-locking in interaction with the thread groove (42) of the drive member (41).

7. A locking device according to claim 6, wherein the torsion rod (7) is turned when the operating member (5) is turned.

8. A locking device according to claim 1, wherein the operating member (5) is configured so that it converts a linear movement of an operator's hand into a rotation of the torsion rod (7).

9. A locking device according to claim 8, wherein the operating member (5) includes a toothed rack that operates against a gear wheel on the torsion rod (7).

10. A locking device according to claim 8, further comprising a screw drive that rotates the torsion rod (7), whereby the locking device is operated by the operating member (5) being pressed in an axial direction.

11. A locking device according to claim 1, further comprising a compression spring to achieve spring-back.

12. A locking device according to claim 1, wherein the operating member (5) comprises a catch device which blocks turning of the operating member at a braking moment.

* * * * *